Jan. 2, 1968 W. K. MATHEWS 3,361,237
OVERRUNNING CLUTCH
Filed March 29, 1965
2 Sheets-Sheet 1

INVENTOR.
WILLIAM K. MATHEWS
BY Fishburn and Gold
ATTORNEYS

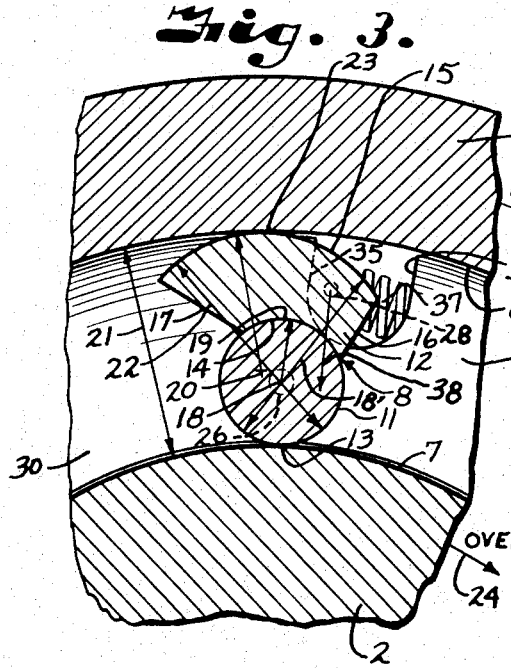
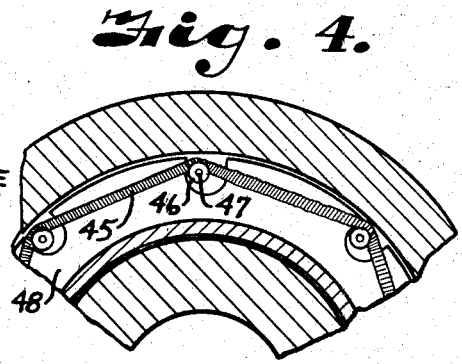
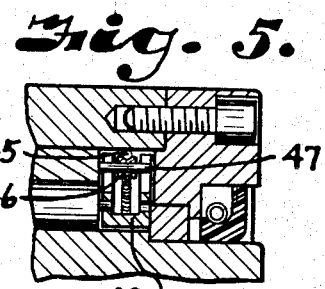
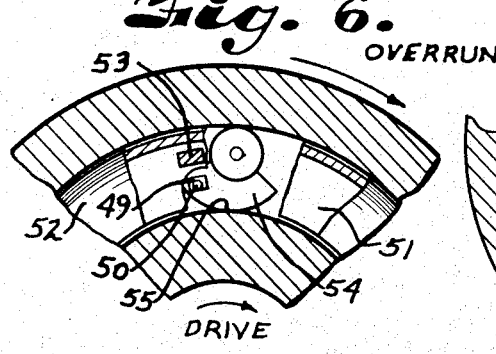
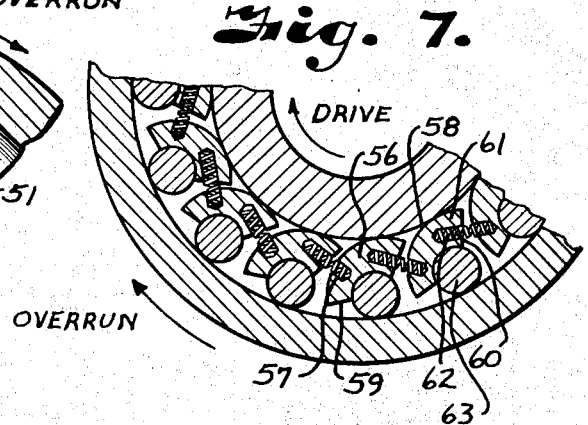
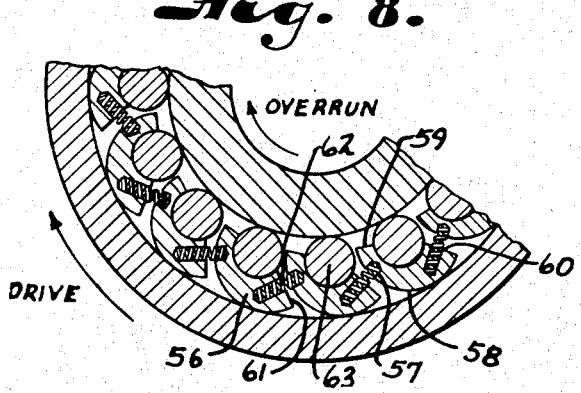

United States Patent Office 3,361,237
Patented Jan. 2, 1968

3,361,237
OVERRUNNING CLUTCH
William K. Mathews, 7301 Mission Road,
Prairie Village, Kans. 66208
Filed Mar. 29, 1965, Ser. No. 443,493
11 Claims. (Cl. 192—45)

ABSTRACT OF THE DISCLOSURE

A one-way clutch has wedging assemblies between inner and outer raceways, each comprising a roll and a cooperating rolloid, the rolloid having an outer convex surface engaging one raceway and an inner concave surface substantially corresponding with the curvature of the roll and rotatably receiving a portion of the roll therein, the roll engaging the other raceway. Various types of biasing structures maintain the assemblies in raceway engagement, including a garter member, variously anchored helical tension and compression springs and magnetic members.

---

This invention relates to one-way or overrunning clutches which include a series of wedging members arranged between concentric cylindrical raceways, and more particularly, to improved clutches of this type which exhibit long life and smooth operation under severe operating conditions.

Several variations of one-way or overrunning clutches are known although all exhibit disadvantages, under certain operating conditions. For example, several overrunning clutches in common use have wedging members which are caused to rub or slide at high speed against a moving surface during overrunning so as to produce rapid and excessive wear on limited contact areas. This is particularly objectionable where centrifugal force adds to the wearing pressure or where abrasive materials in the environment unavoidably gain entrance to the operating parts. In absence of extremely fine tolerances, many existing clutches do not engage all the wedging members uniformly, tending to overload certain of the wedging members, promoting early failure. Other common disadvantages of prior art overrunning clutches include: erratic operation due to wear, excessive delay in taking up load, early failure of cages and springs due to fatigue or wear, raceway crushing or spalling due to load being applied at the same location at each engagement, particularly in cyclic or ratcheting operations, complex design, and the requirement of very thick raceway members to maintain precise roundness needed for correct operation. Further, with some types of existing clutches it is not possible to use a "full pack" of wedging elements thus making it difficult to produce clutches of small size for high load capacity.

The principal objects of the present invention are: to provide a one-way or overrunning clutch structure wherein rapid wear due to high speed sliding on a limited contact area is eliminated; to provide such structure which offers smooth and rapid load pickup and release; to provide such a clutch configuration wherein the wedging members uniformly assume their respective shares of the load at constantly changing points on both inner and outer raceways; to provide an overrunning clutch which does not require a high degree of tolerance in manufacture; to provide an overrunning clutch wedge assembly which may be used with or without retainers or cages; to provide such a clutch structure which may be designed to contain a "full pack" of wedging elements for maximum load capacity with minimum size; to provide such a clutch assembly wherein cages or bias members are not subject to excessive wearing contact or fatigue; to provide an improved biasing arrangement in overrunning clutches which utilizes magnetic forces; to provide a one-way clutch wherein thinner raceway members may be used since substantial raceway distortion may be tolerated; to provide overrunning clutch wedge assemblies which permit adaptation for unusual applications such as centrifugal force control of clutch engagement; and to provide such a torque reacting device which is relatively simple in construction, susceptible to economical manufacturing techniques, and reliable and long lived in use.

Other objects and advantages of this invention will become apparent from the following description taken in connection with the accompanying drawings wherein are set forth by way of illustration and example certain embodiments of this invention.

FIG. 3 is a transverse cross-sectional fragmentary view through a portion of the clutch of FIG. 1, on an enlarged scale, showing a single wedge assembly in operational position.

FIG. 4 is a fragmentary cross-sectional view of a modified form of this invention showing the use of garter springs and saddles for biasing the wedge assemblies.

FIG. 5 is a longitudinal fragmentary cross-sectional view showing further details of the embodiment of FIG. 4.

FIG. 6 is a fragmentary cross-sectional view of a further modified form of this invention showing the use of magnets to bias the wedge assemblies.

FIG. 7 is a fragmentary transverse cross-sectional view of a still further modified form of this invention showing the use of compression springs without retainers for biasing the wedge assemblies and adapted for inner raceway driving operation.

FIG. 8 is a fragmentary transverse cross-sectional view of a modified form of this invention similar to FIG. 7 but adapted for outer raceway driving operation.

Figure 1:
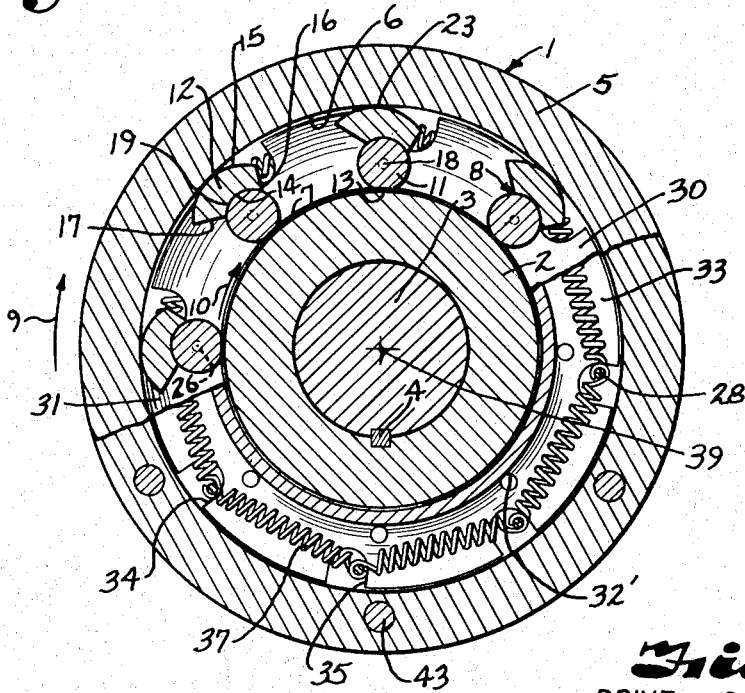
FIG. 1 is a transverse cross-sectional view of a clutch embodying this invention with a portion broken away showing details of a cage and bias spring arrangement.

Referring to the drawings in more detail:

The reference numeral 1 generally indicates a one-way clutch embodying this invention. The clutch 1 has an inner race 2 receiving a drive shaft 3 rotatably fixed therein by means of a suitable key 4. The clutch 1 includes an outer race 5 forming an outer cylindrical raceway 6 spaced concentrically radially outwardly from an inner cylindrical raceway 7 formed by the inner race 2. The clutch 1 includes a series of wedge assemblies 8 which are preferably equally circumferentially spaced apart between the raceways and adapted to rotatably lock the raceways with respect to each other by wedging action when the raceways are urged in one relative rotational direction, as indicated by the arrow 9, and permit free relative movement of the raceways in the opposite relative rotational direction, as indicated by the arrow 10.

Referring particularly to FIG. 3, the wedge assemblies 8 are each comprised of a roll 11 and a rolloid 12. The roll 11 is of cylindrical shape with a diameter less than the radial distance between the raceways 6 and 7 and is adapted to engage the inner raceway along an axially extending circumferentially movable line of contact 13. The rolloid 12 in this example comprises a sector of an eccentric hollow cylinder having spaced apart inner and outer walls 14 and 15 and spaced apart first and second end portions 16 and 17 joining the walls 14 and 15 at the terminations or ends thereof. The inner wall 14 has an inside or concave cylindrical curvature about a radial center 18 substantially coincident with the radial center of the respective roll 11 and rotatably receiving a portion 19 of the roll therein. The rolloid outer wall 15 has an outside or convex cylindrical curvature less than the curvature of the inner wall 14 and on a radial center 20 displaced from the center 18 to a position whereupon the rolloid presents a minimum radial thickness between the inner and outer walls 14 and 15 which gradually continuously increases from the first end portion 16 to the second end portion 17. The rolloid radial thickness at 16, when added to the diameter of the roll 11, presents a dimension 18' which is slightly less than the radial raceway separation 21. The rolloid radial distance at 17, however, when added to the diameter of the roll 11, presents a dimension 22 which is slightly greater than the radial raceway separation 21. Thus, the rolloid outer wall 15 is proportioned to contact the raceway 6 upon a line of contact 23 located between the end portions 16 and 17.

With the above described configuration, the wedge assembly 8 has two degrees of freedom for wedging and releasing between the raceways 6 and 7, that is, the rolloid 12 may rotate either about the line of contact 13 as a pivot point or the roll radial center 18.

In the example of FIG. 3, the inner raceway 7 is the overrunning raceway and moves in the relative direction illustrated by the arrow 24, the driving raceway being the outer raceway 6 moving in the relative direction illustrated by the arrow 25. During overrunning, as noted further below, relative movement between the wedge assemblies 8 and the raceways primarily occurs between the roll 11 and inner raceway 7 rather than between the rolloid outer wall 15 and outer raceway 6, avoiding spot wear at the line of contact 23. The minor relative motion which occurs at the line of contact 23 is insufficient to cause significant wear but will normally produce new wedging positions on the outer raceway 6 to minimize fatigue spalling and crushing. The relative motion between the inner raceway 7 and roll 11 induces a rolling which may or may not produce a surface or peripheral speed of the roll 11 equal to the speed of the inner raceway 7. Regardless of achieving full peripheral speed or partially sliding, however, the rolling of the roll 11 continuously exposes new surface on the roll to the inner raceway 7 thus eliminating spot wear at the line of contact 13.

Rotation of the roll 11, whether caused by complete rolling or a combination of rolling and sliding against the inner raceway 7, produces a sliding relative motion of the roll surface against the inner wall 14 of the rolloid. This sliding relative motion, however, occurs between large matched surfaces and thus cannot produce spot wear. Further, compressive forces at the junction between the roll and rolloid are reduced to a comparatively low unit value reducing the tendency to wear and any minor wear which does occur will not alter the proper cooperative relationship between the roll and rolloid.

Figure 2:
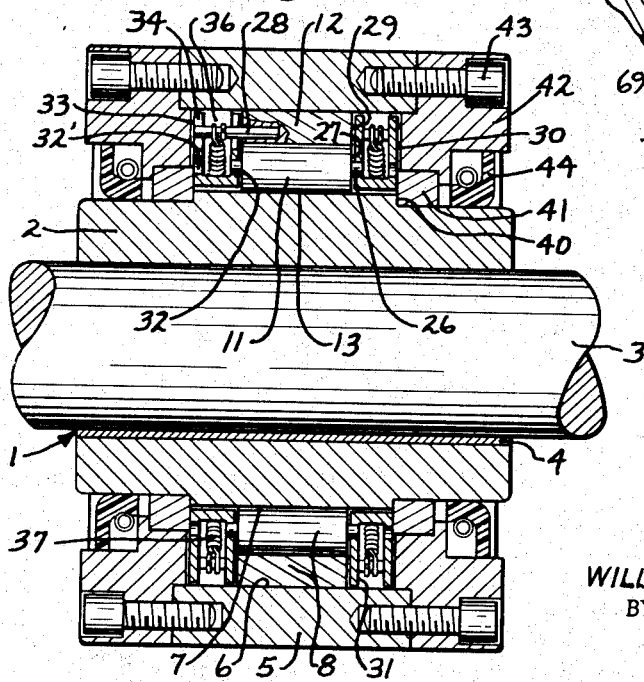
FIG. 2 is a longitudinal cross-sectional view through the clutch of FIG. 1 showing additional details of construction.

In order to maintain the wedge assemblies 8 in position for rapid load takeup, biasing members may be provided so that contact is maintained at all times with both raceways. In the embodiment of FIGURES 1, 2 and 3, the respective wedge assemblies 8 are circumferentially spaced a substantial distance apart between the respective raceways. The rolls 11 each have a stub shaft 26 extending coaxially outwardly from the respective side or end faces 27 thereof and the rolloids 12 each have a stub shaft 28 extending outwardly from the respective side or end faces 29 thereof a greater distance than the roll stub shafts 26. The shafts 28 on each rolloid are coaxially aligned with each other, extend normally outwardly, and are positioned adjacent the smaller or first end portion 16 of the rolloid for a reason noted below.

A pair of circular cages or retainers 30 are of a size permitting rotation between the raceways 6 and 7 and are respectively located adjacent the opposite side or end faces of the rolls and rolloids forming the wedge assemblies 8, FIG. 2. The retainers 30 each have an inner wall 31 facing the respective roll and rolloid end faces, the wall 31 having a plurality of circumferentially spaced apart bores 32 extending normally therein and positioned for rotatably receiving the respective roll shafts 26. It is noted that the retainers 30 are U shaped and have an outer wall 33 with bores 32' aligned with the bores 32, however, in this example, the former merely render the retainers symmetrical to reduce assembly costs and the number of different parts.

The inner and outer walls of the retainer 30 have aligned circumferentially spaced apart cut-out portions or notches 34 therein respectively adjacent each of the bores 32 and 32' and adapted to loosely receive the respective rolloid shafts 28 therethrough. The cut-out portions or notches 34 are located with respect to the bores 32 so that the rolloid shafts 28 are relatively close to a rear wall 35 of the cut-out portion or notch, preventing the shaft 28 from moving rearwardly beyond a predetermined position. Although contact between the rear wall 35 and shafts 28 does not occur under normal operation, if unusual forces or a malfunction should cause the rolloid to rotate to the point of contact between the shafts 28 and rear wall 35, further rotation is thereby prevented which otherwise may result in the rolloid moving to a position where it contacts and rubs against the inner raceway 7.

The retainers 30 form an open circular groove 36 traversed by the respective rolloid stub shafts 28. The roll stub shafts 26 terminate at the inner surface of the wall 31. Resilient tension springs 37 have opposite ends thereof connected between adjacent rolloid shafts 28 whereby each rolloid shaft carries two spring ends. The respective springs 37, being under tension between adjacent shafts 28, produce a resultant force vector illustrated by the arrow 38, FIG. 3, directed toward the axial center 39 of the clutch. Since, in this example, the rolloid shafts 28 are located near or adjacent the first end portion 16, the force vector illustrated by the arrow 38 passes forwardly of the respective roll radial center 18 and the line of contact 13 producing a force couple which tends to rotate the respective rolloid 12 clockwise as illustrated in FIG. 3. This induces a light contact or bias force between the rolloid outer wall 15 and the outer raceway 6 at the line of contact 23. Thus the springs 37 cooperate with the wedge assembly structure in a manner whereby the rolloid 12 may remain substantially stationary with respect to the outer raceway 6 by slip at the inner wall 14, and yet light wedge assembly contact is produced against both the inner and outer raceways at all times during overrun whereupon the clutch is constantly in readiness for immediate engagement when the direction of relative race rotation is reversed. Further, there is virtually no oscillating or flexing of the springs 37 during clutch operation, greatly increasing potential spring life.

Although the complete clutch assemby may take many forms, a typical form is illustrated in FIG. 2 wherein the inner race 2 has opposed outwardly facing radial shoulders 40 against which abut suitable bearings 41. Although the bearings 41, in the illustrated example, are sleeve bearings, it is to be understood that ball bearings, roller bearings or the like may be used instead and in different locations without departing from the scope of this invention. Opposed outer fittings 42 are assembled with the outer race 5 by means of cap screws 43. The bearings 41 are pressed into the fittings 42 and slide against the inner race 2 for maintaining the outer race concentric and longitudinally fixed with respect to the inner race. Suitable grease or oil seals 44 are pressed into the fittings 42 and slidably bear against the inner race to maintain a lubricant within the cavity containing the bearings, retainers, and wedge assemblies.

In operation, it has been found that wear due to sliding of spot or limited contact areas at high speeds is virtually eliminated and the respective wedge assemblies cooperate whereupon each assumes a substantially equal portion of the load during driving engagement. The number required and the particular dimensions of the rolloid and roll for optimum performance and life, as will be apparent to those skilled in the art, is largely dictated by the coefficient of friction between the relatively moving surfaces, taking the type of lubricant used into consideration, and the magnitude and type of load to be transmitted. As noted above, the respective rolls 11 are quite free during overrunning to revolve or roll about their axes in response to any urging from the raceway 7 and thereby slide against the respective rolloid inner wall 14. During wedging, two degrees of freedom are permitted so that wedging may be accomplished by a relative rotation of the rolloid on the roll, a rotation of the rolloid and roll as a unit about the line of contact 13, or a combination of the two. This freedom permits each wedge assembly in the clutch to assume during locking a substantially equal share of the load by providing each with a more uniform start and an ability to more rapidly and independently achieve an optimum position relative to the races. For example, even if rolling of a roll on the race is inhibited, the rolloid may still rotate on the roll to initiate wedging.

It is to be understood that during wedging the balance of forces between the respective roll and rolloid and confining races quickly eliminate rotation of the rolloid about the roll and rolling of the roll on the inner race whereupon the races become locked for driving. However, when the relative rotational direction between the raceways is reversed the subsequent lowering of pressure between the respective roll and rolloid again allows relative movement between the roll and rolloid to come into play, whereupon the two degrees of freedom produce rapid and uniform clutch release, even if rolling of the roll is inhibited. It is noted that the described structure is relatively immune to dimensional variations in the respective parts and to distortion caused by temperature variations and/or high loads. Unlike many of the prior art clutches, the bias springs 37 are not subject to direct wear caused by high speed sliding contact.

In order to facilitate assembly of the clutch it may be desirable to use a continuous garter spring within each retainer rather than a series of separate bias springs 37. Referring to FIGS. 4 and 5, the use of a garter spring 45 is illustrated. A pulley or saddle 46 is mounted on each of the rolloid stub shafts 47 within the retainers 48 whereupon the tension exerted by the garter spring 45 exerts a force toward the clutch axis, as described in connection with FIG. 3. It is noted that the pulleys or saddles 46, if desired, may be rotatably mounted on the shafts 47. Also, the pulleys or saddles 46 may be varied in weight so as to produce varying centrifugal force reactions on the wedge assemblies under conditions wherein the clutch has rotational speeds even though the relative movement between the races is small. Such force reactions, in the proper configuration, may be used to prevent clutch engagement except during predetermined speed conditions.

If desired, bias springs may be eliminated and the function thereof replaced by magnetic attraction or repulsion. Referring to FIG. 6 a magnetic block 49 is secured to each of the rolloid shafts 50 within the groove 51 of the respective retainer 52. Fixed in the groove 51 spaced from each of the magnetic blocks 49 is a magnetic block 53 having a polarity position which repels the block 49, it being understood that the retainer 52 and, if necessary, other parts are formed of non-magnetic material. Thus, a gentle force is continuously applied to the rolloid 54, urging it against the inner raceway 55. For illustration, in this configuration the components are positioned so that the relative directions of drive and overrun are reversed from that of FIG. 3. Thus, the rolloids contact the inner raceway rather than the outer raceway.

Referring to FIGS. 7 and 8, there are illustrated modified clutches embodying this invention having a different form of spring biasing and a greater number of wedge assemblies than that of FIG. 1. The embodiment of FIG. 7 is adapted for inner race driving and the embodiment of FIG. 8 is adapted for outer race driving. No retainer rings are required and each rolloid 56 has a blind bore 57 extending into the outer wall 58 thereof adjacent the first or smaller end portion 59. The rolloids 56 also have a blind bore 60 extending into the second or larger end portion 61 thereof and aligned with the outer wall bore 57 of the adjacent rolloid. A helical compression or bias spring 62 has opposite ends thereof engaged in each set of aligned bores 57 and 60. The resultant compressive force urges each of the rolloid outer walls against one raceway and the rolloid inner walls against the respective roll 63 urging same against the other raceway to bias the wedge assembly. The operation of the embodiments shown in FIGS. 7 and 8 is similar to that described above in connection with the embodiment of FIGS. 1 and 3.

Figure 9:
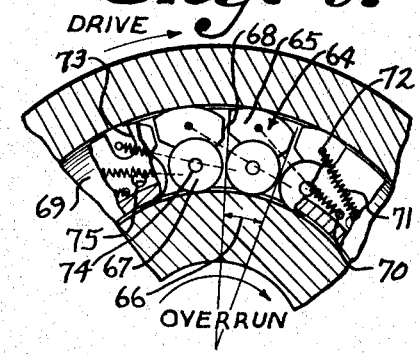
FIG. 9 is a fragmentary transverse cross-sectional view of an additional modified form of this inveniton having a full complement or "pack" of wedge assemblies and a bias spring arrangement with one spring and anchored to the retainer.

For certain applications it is necessary that the clutch be small and yet have a large load capacity. Under these conditions it is desirable to include as many wedging elements as possible between the inner and outer raceways. Referring to FIG. 9, this embodiment has a full complement or "pack" of wedge assemblies 64 adapted for outer race driving. The rolloids 65 of the assemblies 64 are shortened in circumferential dimension so as to subtend a clutch sector angle 66 no larger than the respective rolls 67. Space 68 between adjacent rolloids is limited to that required to permit clutch operation and to compensate for any wear and distortion which might occur. Although other biasing arrangement may be used, in this embodiment the retainers 69 have circumferentially spaced pins 70 secured therein and anchoring one end of a tension spring 71, the other end of the spring being anchored to a rolloid shaft 72 extending through a retainer cut-out portion 73. Roll stub shafts 74 extend into circumferentially spaced apart retainer bores 75 as in the embodiment shown in FIG. 2. The tension exerted by the spring 71 produces a force couple as described above in connection with the embodiment of FIG. 3 to bias the respective wedge assemblies. It is noted, however, that each spring 71 is independent of adjacent springs in producing the respective biasing couple.

Although certain forms of this invention have been illustrated and described, it is not to be limited thereto except insofar as such limitations are included in the following claims.

What I claim and desire to secure by Letters Patent is:
1. A wedge assembly for a one-way clutch having radially spaced apart inner and outer concentric raceways, said assembly being adapted to selectively rotatably lock said raceways with respect to each other by the wedging action of a plurality of said assemblies circumferentially positioned between said raceways, said assembly comprising:

(a) a roll having a diameter less than the radial distance between said raceways and a curved surface adapted to engage one of said raceways, and (b) a rolloid forming a sector having spaced apart inner and outer walls and spaced apart first and second end portions joining said walls, (c) said inner wall having a concave curvature substantially corresponding with said roll curved surface and rotatably receiving a portion of said roll therein, said rolloid outer wall having a convex curvature and being adapted to engage the other of said raceways, (d) said rolloid having a minimum thickness between said inner and outer walls which increases between said first end portion and said second end portion, said rolloid thickness when added to said roll diameter being slightly less than the radial distance between said raceways nearer said first end portion and slightly greater than the radial distance between said raceways nearer said second end portion, (e) whereby said assembly has two degrees of freedom for wedging between said raceways.

2. A one-way clutch having radially spaced apart inner and outer concentric raceways and a plurality of circumferentially positioned wedging assemblies between said raceways, (a) said wedging assemblies each comprising a roll and a rolloid, (b) said roll being of cylindrical shape and having an outside surface with a diameter less than the radial distance between said raceways and adapted to engage one of said raceways, (c) said rolloid forming a sector having spaced apart inner and outer walls and spaced apart first and second end portions joining said walls, said inner wall having a concave curvature substantially corresponding with said roll surface and rotatably receiving a portion of said roll therein, said rolloid outer wall having a convex curvature and adapted to engage the other of said raceways, (d) said rolloid having a minimum thickness between said inner and outer walls which increases from said first end portion to said second end portion, said rolloid thickness when added to said roll diameter being slightly less than the radial distance between said raceways adjacent said first end portion and slightly greater than the radial distance between said raceways adjacent said second end portion, and (e) bias means adapted to urge said rolls and rolloids into engagement with said respective raceways.

3. The clutch as set forth in claim 2 wherein:

(a) said bias means comprises a resilient tensile garter member surrounding said inner raceway and surrounded by said outer raceway and operably engaging each of said rolloids.

4. The clutch as set forth in claim 2 wherein:

(a) said rolls each have oppositely facing sides and a shaft extending coaxially outwardly respectively therefrom, (b) said rolloids each have oppositely facing sides and a shaft extending outwardly respectively therefrom, (c) a pair of circular retainers for maintaining said assemblies in circumferentially spaced apart relation, said retainers being located in opposed relation adjacent said respective roll and rolloid sides, said retainers each having a wall facing said respective roll and rolloid sides and having a plurality of circumferentially spaced apart bores therein for rotatably receiving said respective roll shafts, said rolloid shafts being movable in the plane of said walls with respect to said retainers, (d) said bias means cooperating with said rolloid shafts and producing force couples with the respective rolls for urging said rolls and rolloids into said raceway engagement.

5. The clutch as set forth in claim 4 wherein:

(a) said bias means comprises a plurality of tension springs each having opposite ends connected to adjacent rolloid shafts.

6. The clutch as set forth in claim 2 wherein:

(a) said bits means comprises a saddle associated with each of said rolloids, and (b) a garter spring engaging said saddles.

7. The clutch as set forth in claim 4 wherein:

(a) said bias means comprises a magnetic member secured with respect ot said rolloids, and (b) a magnetic member secured with respect to said retainers and respectively adjacent said first named magnetic member, (c) said first and second named magnetic members being positioned with respect to each other whereby the magnetic field therebetween urges said rolls and rolloids into said raceway engagement.

8. The clutch as set forth in claim 4 wherein:

(a) said retainer wall has circumferentially spaced apart cut-out portions therein respectively adjacent each of said bores and loosely receiving said respective rolloid shafts therethrough, said cut-out portions forming stops to prevent the rotation of said rolloids on said rolls past predetermined positions.

9. The clutch as set forth in claim 4 wherein:

(a) said bias means comprises a plurality of tension springs each having one end connected to one of said rolloid shafts, and (b) said retainers have a plurality of circumferentially spaced anchor members thereon and displaced from said rolloid shafts, (c) the other end of said tension springs being anchored to said anchor members.

10. The clutch as set forth in claim 2 wherein:

(a) said rolloids each have a bore extending into said outer wall thereof adjacent said first end portion, said rolloids each have a bore extending into said second end portion thereof, said last named bore being aligned with the first named bore of the adjacent rolloid, and (b) said bias means comprises a helical compression spring having opposite ends thereof engaged in each respective set of aligned bores, whereby the force exerted on said assemblies by said springs urges said rolls and rolloids into said raceway engagement.

11. A one-way clutch having inner and outer radially spaced apart concentric cylindrical raceways and a plurality of wedging assemblies circumferentially positioned between said raceways, (a) said wedging assemblies each comprising a roll and a rolloid, (b) said roll being of cylindrical shape with a diameter less than the radial distance between said raceways and adapted to engage one of said raceways along a common axially extending circumferentially movable line of contact, (c) said rolloid comprising a sector of an eccentric hollow cylinder, said sector having spaced apart inner and outer walls and spaced apart first and second end portions joining said walls, said inner wall having an inside cylindrical curvature about a radial center substantially coincident with the radial center of said roll and rotatably receiving a portion of said roll therein, said rolloid outer wall having an outside curvature less than said inside curvature and on a radial center displaced from said first named center whereupon said rolloid presents a minimum thickness between said inner and outer walls which gradually increases continuously from said first end portion to said second end portion, (d) said rolloid thickness when added to the diameter of said roll being slightly less than the radial distance between said raceways adjacent said first end portion and slightly greater than the radial distance between said raceways adjacent said second end portion, (e) said rolloid outer wall being adapted to contact the other of said raceways, and means for resiliently urging said roll and rolloid into engagement with said respective raceways.

References Cited

UNITED STATES PATENTS

| | | | |
|---|---|---|---|
| 1,927,060 | 9/1933 | Ballard | 192—45 |
| 2,322,608 | 6/1943 | Webster | 192—45 |
| 2,624,435 | 1/1953 | Stephenson | 192—45 |
| 2,684,139 | 7/1954 | Lewis | 192—45 |
| 2,685,944 | 8/1954 | Faucher et al. | 192—45 |
| 2,762,479 | 9/1956 | Ullery | 192—45 |
| 3,017,964 | 1/1962 | Von Thuengen | 192—45 |
| 3,119,480 | 1/1964 | Fuchs | 192—44 |
| 3,231,212 | 1/1966 | Blake | 192—45 |

FOREIGN PATENTS

| | | |
|---|---|---|
| 436,967 | 2/1912 | France. |
| 841,721 | 7/1960 | Great Britain. |

FRED C. MATTERN, Jr., *Primary Examiner.*

DAVID J. WILLIAMOWSKY, *Examiner.*

C. J. HUSAR, *Assistant Examiner.*